(12) United States Patent
Pernstich et al.

(10) Patent No.: US 8,953,150 B2
(45) Date of Patent: *Feb. 10, 2015

(54) OBSERVATION DEVICE WITH RANGE FINDER

(75) Inventors: Ludwig Pernstich, Rum (AT); Konrad A. Rolder, Mils (AT); Andreas Zimmermann, Fulpmes (AT); Gavin Lancaster, Innsbruck (AT)

(73) Assignee: Swarovski-Optik KG. (AT)

( * ) Notice: Subject to any disclaimer, the term of this patent is extended or adjusted under 35 U.S.C. 154(b) by 1194 days.

This patent is subject to a terminal disclaimer.

(21) Appl. No.: 12/865,471

(22) PCT Filed: Jan. 30, 2009

(86) PCT No.: PCT/AT2009/000037
§ 371 (c)(1),
(2), (4) Date: Nov. 1, 2010

(87) PCT Pub. No.: WO2009/094687
PCT Pub. Date: Aug. 6, 2009

(65) Prior Publication Data
US 2011/0051117 A1 Mar. 3, 2011

Related U.S. Application Data

(60) Provisional application No. 61/137,406, filed on Jul. 30, 2008.

(30) Foreign Application Priority Data

Jan. 31, 2008 (AT) .................................. A 153/2008
Feb. 1, 2008 (AT) .................................. A 163/2008
Feb. 2, 2008 (EP) .................................... 08001979

(51) Int. Cl.
*G01C 3/08* (2006.01)
*G01S 7/481* (2006.01)
(Continued)

(52) U.S. Cl.
CPC .................. *G01C 3/04* (2013.01); *G01S 7/4812* (2013.01); *G01S 7/4817* (2013.01); *G01S 17/10* (2013.01);
(Continued)

(58) Field of Classification Search
USPC ............. 356/3.01–3.15, 4.01–4.1, 5.01–5.15, 356/6–22, 28, 28.5; 359/407, 412
See application file for complete search history.

(56) References Cited

U.S. PATENT DOCUMENTS 3,622,242 A 11/1971 Land et al.
3,680,946 A 8/1972 Bellows
(Continued)

FOREIGN PATENT DOCUMENTS

DE 6918690 U 12/1969
DE 2502662 A1 8/1975
(Continued)

OTHER PUBLICATIONS

"Experience Your Vision", New: Victory RF Binoculars, leaflet published in the Internet, Jan. 14, 2008.
(Continued)

*Primary Examiner* — Luke Ratcliffe
*Assistant Examiner* — Assres H Woldemaryam
(74) *Attorney, Agent, or Firm* — Lerner, David, Littenberg, Krumholz & Mentlik, LLP (57) ABSTRACT

The invention relates to a binocular observation device, in particular binoculars, having two visual beam paths and a laser range finder with a laser transmitter and a laser receiver and with an opto-electronic display element. A part of one of the beam paths of the laser transmitter is integrated into a first visual beam path, wherein a part of one beam path of the laser receiver is furthermore also integrated into the first visual beam path.

22 Claims, 7 Drawing Sheets (51) Int. Cl.

| | | |
|---|---|---|
| *G01S 17/10* | (2006.01) | |
| *B25G 1/00* | (2006.01) | |
| *G02B 23/18* | (2006.01) | |
| *G02B 7/06* | (2006.01) | |
| *G01C 3/04* | (2006.01) | |
| *G01S 17/08* | (2006.01) | |
| *G01S 17/02* | (2006.01) | |
| *F41G 3/06* | (2006.01) | |
| *G02B 23/04* | (2006.01) | |
| *G02B 23/10* | (2006.01) | |
| *B25G 1/10* | (2006.01) | |
| *G02B 7/12* | (2006.01) | |

(52) U.S. Cl.
CPC ......... *B25G 1/00* (2013.01); *G02B 23/18* (2013.01); *G02B 7/06* (2013.01); *G01S 17/08* (2013.01); *G01S 17/023* (2013.01); *F41G 3/06* (2013.01); *G02B 23/04* (2013.01); *G02B 23/10* (2013.01); *B25G 1/102* (2013.01); *G02B 7/12* (2013.01)
USPC ........ 356/4.01; 356/3.01; 356/5.01; 359/407; 359/412

(56) References Cited

U.S. PATENT DOCUMENTS

| | | | |
|---|---|---|---|
| 4,262,990 A | 4/1981 | Kamakura | |
| 4,886,347 A | 12/1989 | Monroe | |
| 5,126,549 A | 6/1992 | Yamada | |
| 5,235,458 A | 8/1993 | Akagi et al. | |
| 5,610,761 A | 3/1997 | Ishibashi et al. | |
| 5,616,903 A | 4/1997 | Springer | |
| 5,644,425 A | 7/1997 | Palmer | |
| 5,771,407 A * | 6/1998 | Imafuji et al. | 396/55 |
| 5,923,468 A | 7/1999 | Tsuda et al. | |
| 6,142,636 A | 11/2000 | Nemoto et al. | |
| 6,204,961 B1 * | 3/2001 | Anderson et al. | 359/353 |
| 6,233,094 B1 | 5/2001 | Tsuda | |
| 6,266,185 B1 | 7/2001 | Miller et al. | |
| 6,292,314 B1 * | 9/2001 | Perger | 359/834 |
| 6,330,056 B1 | 12/2001 | Zadravec | |
| 6,580,495 B2 | 6/2003 | Shirai | |
| 6,753,951 B2 * | 6/2004 | Fukumoto | 356/4.01 |
| 7,244,033 B2 | 7/2007 | Yamanouchi | |
| D579,472 S | 10/2008 | Yanagisawa | |
| 7,483,208 B2 | 1/2009 | Zadravec | |
| 7,654,029 B2 * | 2/2010 | Peters et al. | 42/111 |
| 7,738,082 B1 | 6/2010 | Peters | |
| 2001/0028450 A1 * | 10/2001 | Zadravec | 356/4.01 |
| 2001/0028498 A1 * | 10/2001 | Haga et al. | 359/407 |
| 2002/0071126 A1 | 6/2002 | Shirai et al. | |
| 2003/0002149 A1 | 1/2003 | Watanabe | |
| 2003/0086072 A1 | 5/2003 | Fukumoto et al. | |
| 2004/0046953 A1 | 3/2004 | Nagata et al. | |
| 2005/0036129 A1 | 2/2005 | Watanabe | |
| 2006/0193039 A1 * | 8/2006 | Yamauchi et al. | 359/407 |
| 2007/0097351 A1 * | 5/2007 | York et al. | 356/5.02 |
| 2007/0174152 A1 * | 7/2007 | Bjornberg et al. | 705/28 |
| 2008/0007826 A1 | 1/2008 | Smith et al. | |
| 2009/0141371 A1 | 6/2009 | Brown et al. | |
| 2009/0201581 A1 | 8/2009 | Gebelein | |

FOREIGN PATENT DOCUMENTS

| | | | | |
|---|---|---|---|---|
| DE | 2714412 A1 | 10/1978 | | |
| DE | 29518708 U | 1/1996 | | |
| DE | 19727988 A1 | 1/1998 | | |
| DE | 19801519 A1 | 7/1998 | | |
| DE | 19933172 C1 | 1/2001 | | |
| DE | 10122936 A1 | 11/2001 | | |
| DE | 102004054182 | * | 7/2005 | ............ G02B 23/10 |
| DE | 102004054182 A1 | 7/2005 | | |
| DE | 202006017705 U1 | 1/2007 | | |
| EP | 0932065 A1 | 7/1999 | | |
| EP | 0961147 A1 | 12/1999 | | |
| EP | 1069442 A2 | 1/2001 | | |
| EP | 1298480 A1 | 4/2003 | | |
| EP | 1744196 A1 | 1/2007 | | |
| EP | 1783529 A1 | 5/2007 | | |
| EP | 2078975 A1 | 7/2009 | | |
| GB | 1477201 A | 6/1977 | | |
| GB | 1600191 A | 10/1981 | | |
| JP | 2002098762 A | 4/2002 | | |
| JP | 2007127690 A | 5/2007 | | |
| WO | 8802125 A1 | 3/1988 | | |
| WO | 9711399 A1 | 3/1997 | | |

OTHER PUBLICATIONS

Binoculars, Celestron SkyMaster 71009, Mar. 2005.
International Search Report, PCT/AT2009/000039, dated Jun. 25, 2009.
International Search Report, PCT/AT2009/000037, dated Sep. 30, 2009.
International Search Report, PCT/AT2009/000038, dated Jul. 14, 2009.

\* cited by examiner

OBSERVATION DEVICE WITH RANGE FINDER

CROSS REFERENCE TO RELATED APPLICATIONS

The present application is a national phase entry under 35 U.S.C. §371 of International Application No. PCT/AT2009/000037, field Jan. 30, 2009, published in German, which claims the benefit of Austrian Patent Application No. A 153/2008, filed Jan. 31, 2008; Austrian Patent Application No. A 163/2008, filed Feb. 1, 2008; European Patent Application No. 08001979.7, filed Feb. 2, 2008; and U.S. Provisional Application No. 61/137,406, filed Jul. 30, 2008. The discloser of said applications are incorporated by reference herein.

The invention relates to a binocular observation device, in particular binoculars or a long-range optical device, having a laser range finder corresponding to the features of the preambles of the claims and a method for the observation and measurement of the range of a distant object.

Binocular field glasses with a laser range finder are known, in which a functional element of the laser range finder is also integrated into one of the two visual beam paths. Thus, as described in DE 10 2004 054 182 B4, the objective-side beam path of one of the two observation beam paths of the binoculars simultaneously forms a part of the beam path of the laser receiver and the laser radiation reflected by the object is deflected to the laser receiver or detector respectively by means of an optical splitter. On the other hand a separately constructed beam path is provided for the laser transmitter, arranged in the region of the hinging axis of the binoculars and aligned parallel to the observation axes of the visual beam path. A collimation lens is provided for this purpose in front of the laser transmitter on the light output side. The disadvantage of this is that when performing range finding over shorter distances, measurement discrepancies can occur due to parallax errors.

Furthermore, it is already known from U.S. Pat. No. 6,753,951 B2 to provide a laser range finder in a long-range optical device which can be used to observe a remote object via a visual beam path. In this arrangement a laser beam is introduced into the visual beam path between the eye of the observer and user of the visual beam path and a focusing device for the visual beam path, and the laser beam reflected by the object is fed to a laser receiver for analysis via an optical system in front of the eye of the user. A disadvantage of this is that a rotating screen driven by a motor is required, in order to maintain a separation of the emitted laser beam and the reflected laser beam.

Further known long-range optical devices have dedicated beam paths both for the visual beams and the laser beam and the reflected laser beams, which are directed towards the remote object via separate optical devices. The focusing of the laser beam in such arrangements, both for the emitted laser beam and for the laser beam reflected from the object, is effected via respectively dedicated focusing devices, which are drive-connected to the focusing device for the visual beam path activated by the operator. Due to the complex structure, a large number of mechanical and optical components are required.

Other long-range optical devices, for example that of DE 197 27 988 A1 and those of DE 69 18 690 U, DE 295 18 708 U1, DE 101 22 936 A1 and DE 27 14 412 A1 also described a very wide range of configurations of laser range finders in connection with visual beam paths, wherein an exact measurement result cannot be achieved however, due to the complex structure and the guiding of the beam.

The problem addressed by the invention is to improve a binocular observation device or long-range optical device with a laser range finder in such a way as to obtain a higher accuracy, or higher reliability, of the relative alignment of the optical axes of the beam path of the laser transmitter and of the laser receiver with respect to each other or to the optical axis of the visual beam path. A further preferably independent problem addressed by the invention is to obtain an increased efficiency in the range finding with respect to the laser power required. In addition, a problem also addressed by the invention is to devise a method of observation and measurement of the range of a remote object, which allows increased user-friendliness.

The problem addressed by the invention is solved in a [device?] as named above by the fact that the regions of deflection are localized on a single optical component.

This now provides the advantage that the emitted measurement beam for determining the distance between the observation device and a remote object is aligned exactly to the visual beam path. This means that the cost in terms of optical elements can be reduced, which means also that the weight of the observation devices can be reduced. The low weight and compact construction making use of fewer mechanical components allows a small design, as is required in binocular observation devices—which are also referred to as binoculars and used for example in hunting, hobby activities, in shipping and the like. With these binoculars it is common for the user to hold them in their hands for sighting or aiming, and it is therefore advantageous if they can be easily grasped due to the compact construction. Furthermore, a low weight facilitates a considerably longer period of use, but in particular accurate jitter-free holding for longer periods for sighting the object, and this considerably enhances the use of the device.

The problem is also, however, independently solved by the fact that the focusing device for focusing the beam path of the laser transmitter and of the visual beam path is arranged between the objective and the optical component for deflecting the beam path of the laser transmitter. An advantage of this solution is that due to the arrangement of the focusing device not only the visual beam path but also, without additional effort, the beam path of the laser transmitter can be focused at the same time.

A further independent solution of the problem addressed by the invention is obtained by the fact that a part of one beam path of the laser receiver is also integrated into the first visual beam path. By screening off the returning measurement beam reflected by the object from the first visual beam path, no special optical elements, such as an objective for example, need be provided in the long-range optical device. Considerable weight savings and a construction with smaller external dimensions can therefore be obtained.

Another solution to the problem however, independent of this, is one in which a part of a beam path of the laser receiver is also focused with the focusing device for the visual beam path. This means that the measurement result can be improved, since returning measurement beams reflected by the object can be fed to the analysis units or measurement signal receivers already focused.

A further considerable weight saving, and in particular a simplified construction of the optical beam path, can be obtained if optical components for effecting the intersection of the beam paths of the laser transmitter and of the laser receiver are arranged in order to integrate the beam path of the laser transmitter and the beam path of the laser receiver into the first visual beam path.

The accuracy of the laser beam paths of both the transmitted as well as the reflected laser beam is then obtained if regions of the intersection of the beam paths of the laser transmitter and/or the laser receiver are localized on a single optical component.

According to a further advantageous configuration the regions of the intersection of the beam path of the laser transmitter and/or the laser receiver are localized on a single surface of one optical component, for example a roof prism, since this means no separate dedicated components are required for the transmitted and the reflected laser beam.

A short construction type, that is, in relation to the length in the direction of the visual beam path, that is particularly advantageous for manually operated and used optical devices is then possible if the region of the intersection is arranged between an observer-side focal point of the objective and the focusing device or the objective.

A reduction in the volume of such a remote optical device, in particular in the diameter of the housing or tubing, can be obtained if at least one part of a beam path of the display optics or of the display element is integrated in one of the two visual beam paths.

Also advantageous is a configuration in which a control and analysis unit is connected to at least one display element for displaying a target mark and/or a reading of the laser range finder in at least one of the two visual beam paths. This allows a reduction in the components required for the various displays.

According to another extension of the invention, a long-range transmission means is arranged for the remote transmission, in particular wireless transmission, of a distance determined by the laser range finder and/or at least one of the following data items, such as a value for the focusing position, an enlargement factor, a brightness or temperature value, to a display element and/or the control and analysis unit. This enables the corresponding transmission of data to users of similar or identical long-range optical devices, and visual and graphical reproduction on suitable displays and computers for analysis and/or archiving in a simple manner. Furthermore, targeting during hunting or observation can be simply documented and [transferred to] other systems, such as for example setting of telescopic sights or determination of shooting positions.

The checking and forwarding of data to persons other than the user of the long-range optical device is easily facilitated if an additional display element is arranged on the outside of the observation device.

Subsequent processing of stored data is also advantageously obtained by the fact that the control and analysis unit is connected wirelessly via remote transmission means to an external display element independent of the observation device.

Precise acquisition and recognition of the displayed data or information is obtained if the display element is formed from opto-electrical components, in particular LED or LCD displays with individual control capability of individual image-forming pixels. This construction furthermore enables the widest range of data signals, labels, targets or symbols needed by the user to be displayed on one display element, in direct succession and/or combination if desired.

An even more precise focusing of the visual beam path onto the object can be obtained if an adjustment motor is connected to the focusing device. This means that the focusing device can keep track of the actually automatically determined range without requiring the user to make additional manual adjustments.

It is advantageous here if the control and analysis unit is connected to the adjustment motor, since this means that fully automatic control of the tracking of the focusing device can be achieved.

For a universal application of the long-range optical device, in particular in binoculars having two parallel visual beam paths spaced a distance apart for both eyes of the user, an advantageous configuration has proved to be one in which the two observation parts are connected together via two connection devices spaced apart from each other in the direction of the beam path, e.g a hinged bridge or a telescopic guide, such that they can be adjusted in their relative position to each other. This is so that a rapid adaptation to different eye separations is possible, preferably without changes to the focus setting.

The maintenance of the accuracy of the visual observation and the range finding however is promoted by the fact that the two observation parts are adjustably connected relative to each other via two connection devices, spaced apart from each other in the direction of the beam path along the observation direction, to two separate hinged axes, between which a free space is present that is bounded at the side by the observation parts.

Individual adjustment to the eye positions of different people is possible due to the fact that the connection element, in both of its end regions facing the two observation parts, is connected via a hinge to each of the two observation parts, the pivot axes of which extend, for example, parallel to the longitudinal axes of both observation parts. Stable and accurate connections, which enable a high degree of parallelism between the visual beam paths and the beam paths of the range-finding device, are obtained if one or more hinged bridges are arranged as the connecting element.

An advantageous variant embodiment however is one in which a keel-shaped housing extension is formed on at least one of the observation parts. This is the case since the electronic components, such as supply devices and possibly computing devices and display elements, can be arranged outside the tubes required for the optical beam paths.

By having the housing extension comprise an inner accommodation region for the device electronics, in particular for the control and analysis unit, a high degree of multi-functionality is created and an embodiment which can be specially adapted in a plurality of variants to different application types.

According to another, further embodiment of the invention, an observation part is constructed as a self-contained long-range optical device. This is because parts of a long-range optical device, in particular binoculars with two observation parts, can be used as separate parts for special applications, for example for use on weapons.

Another advantageous embodiment however is one in which the optical component or components for deflecting the beam path of the laser transmitter and/or the laser receiver are formed by the components of a reversing system. This means that the multi-functionality of the optical element for different beam guides of the beam path as well as the measurement beam paths achieves a considerable simplification of the optical system and in addition, reduces the number of optical elements required. Nevertheless, due to the reduced number of optical elements, equally high accuracy of the optical device can be obtained at low weight.

A compact construction can be obtained by the regions of the deflections being arranged on one and the same optical component, formed by a roof prism, wherein it is advantageous if the reversing system is formed by a prism system.

The solution to the present problem addressed by the invention however can be obtained independently by the construction of a binocular observation device of the type mentioned above, if the third beam path comprises a focusing device which is interactively coupled to a focusing device of the two visual beam paths for focusing on a remote object. This means that a device constructed in this way can be used at both close range and long range.

Since the optics for the emitted or reflected laser beam can be specially shaped and despite the fact that the visual beam paths can be used for one of the two beams, namely either the outgoing laser beam or the reflected laser beam, a good relationship can be achieved between the optical matching, the weight and a simple construction.

An extremely advantageous compact type of construction can be obtained however by the third beam path comprising a transmitter focusing device, which is coupled to a focusing device of both the visual beam paths for simultaneous focusing of the beam paths and of the laser transmitter and a part of one beam path of the laser transmitter or of the laser receiver is integrated into one of the visual beam paths.

The problem addressed by the invention is also independently solved however in a long-range optical device by the fact that the regions of deflection are localized on a single optical component. This facilitates a construction having very low weight and with few optical components in the smallest space.

The problem addressed by the invention is also solved however by a method for observation and measurement of the range of an object. This method is characterized in that the object is sighted by means of the visual beam path and the measurement process is initiated by emitting a laser pulse from the laser transmitter and a propagation time is determined, whereupon by means of a control and analysis unit, a value for the distance to the remote object is calculated and displayed, and based on the value for the distance a focusing process is carried out by adjustment of a focusing device.

Another combination of measures that independently solves the problem provides that the object is sighted by means of the visual beam paths and the measurement process is initiated by emitting a laser pulse from the laser transmitter via the laser beam path at least partially integrated into the visual beam path and a propagation time is determined, whereupon by means of a control and analysis unit a value for the distance to the remote object is calculated and displayed, and based on the value for the distance both the visual beam paths and the laser beam path are focused by adjustment using the focusing device. An advantage of this method is that, using the determined range, for example based on a coarse adjustment of the focusing device, the exact range can be determined and subsequently the visual beam paths and, for example, the laser beam path of the transmitted or reflected laser beam can be focused. This considerably increases the accuracy and speed of the focusing procedure, as is required for example in hunting, in particular when observing animated objects. Thus a constantly sharp image of the object is guaranteed, even while it is in motion.

Further advantageous measures facilitate the focusing to be carried out semi-automatically or automatically or following a manual coarse adjustment, that the imaging takes place after a manual coarse adjustment, in order to enable accurate focusing to take place even under poor visibility conditions.

It is also advantageous, however, if the method steps of initiating a measurement procedure, calculation of a value for the range of the remote object and the focusing of the focusing device based thereon are carried out repeatedly in sequence. This is because by this method, the continuous focusing of the object to be sighted is guaranteed even when it is in motion.

It is also advantageous if the method steps for observing a moving object are continually repeated.

Optimization of the measurement result can be achieved by the fact that the adaptation and/or optimization of the laser power of the laser transmitter is carried out via the control and analysis unit in accordance with the measured distance between the laser transmitter and the object.

To allow a better understanding of the invention this will be explained in more detail with the aid of the following drawings.

In a highly simplified schematic representation, they show.

It should first of all be noted that in the various embodiments described, equivalent parts are assigned identical labels or component designations respectively, the disclosures contained in the entire description being analogously transferrable to equivalent parts with identical labels or component designations. Also, the positional details chosen in the description, such as above, below, to the side etc., refer to the immediately described and illustrated Figure, and when there is a change of position are to be carried over analogously to the new position. Further, individual features or feature combinations from the various exemplary embodiments shown and described can also represent, per se, solutions that are independent, inventive or according to the invention.

All information on value ranges in the description of the subject matter are to be understood in the sense that they also comprise any and all sub-ranges thereof, e.g. the range 1 to 10 is to be understood to mean that all sub-ranges, starting at the lower limit 1 and the upper limit 10 are also included, i.e. all sub-ranges begin with a lower limit of 1 or greater and end at an upper limit of 10 or less, e.g. 1 to 1.7, or 3.2 to 8.1 or 5.5 to 10.

Figure 1:
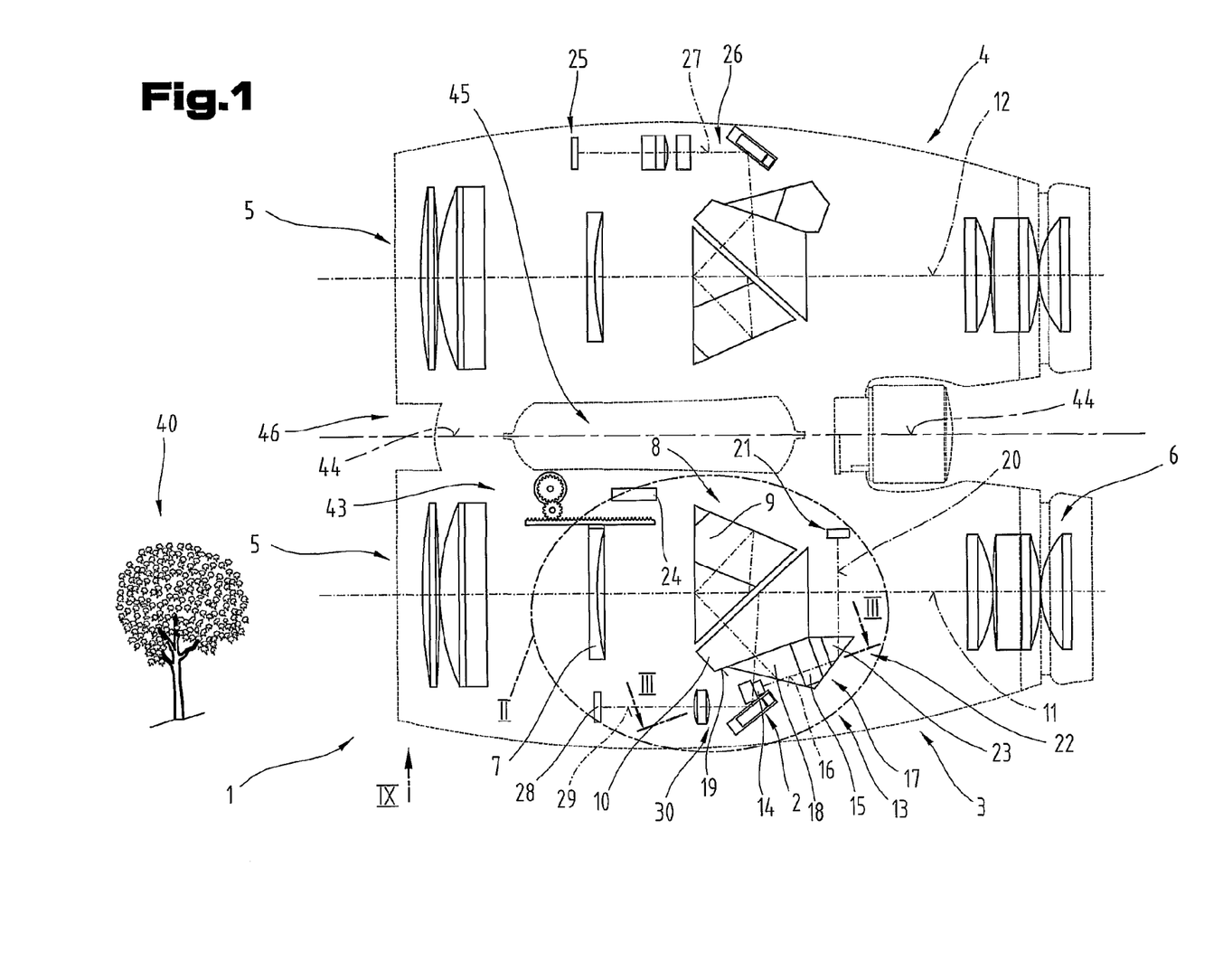
FIG. 1 an optical layout of a pair of binoculars with an integrated range finder.

FIG. 1 shows an optical layout of an observation device 1, in particular of a pair of binoculars with an integrated laser range finder 2.

The observation device 1 comprises a first observation part 3 and a second observation part 4, which each taken separately form a long-range optical device. With regard to their optical components both observation parts 3, 4 are of identical construction and comprise first of all an objective 5 and an ocular 6 to provide an enlarged representation of an observed object. According to this exemplary embodiment the focus setting is effected by means of a focusing device 7, which is preferably formed by a lens. To represent the observed object upright and with the correct lateral orientation a reversing system 8 is arranged between the focusing device 7 and the ocular 6. According to this exemplary embodiment the reversing system 8 is formed by a prism system, comprising a roof prism 9 and a deflection prism 10. By means of the cited optical components, a first visual beam path 11 of the first observation part 3 and a second visual beam path 12 of the second observation part 4 are specified. For greater clarity the beam paths 11 and 12 are each shown in simplified form, and symbolized only by the corresponding main beams or the optical axes of the corresponding observation parts 3 and 4.

It is a general convention here that in the entire description, whenever beam paths are under discussion a bundle of beams, that is, a so-called homocentric beam bundle, is to be understood.

For the range-finding measurement the first observation part 3 is also a transmission optical system 13 with a laser transmitter 14 and a transmitter optics 15. The laser transmitter 14 is integrated into the first observation part 3 in such a way that a part of a beam path 16 of the laser transmitter 14 is deflected into the first visual beam path 11. In order to deflect the beam path 16 of the laser transmitter 14, optical components are provided in the first observation part 3, which according to this exemplary embodiment are formed by a deflection prism 17 and a splitter prism 18. For this purpose, the splitter prism 18 is arranged on the surface 19 of the deflection prism 10 lying opposite the roof prism 9, or on the surface 19 of the roof prism and connected thereto. The surface 19 forms a beam splitter, by the fact that a partially transparent coating is provided thereon. By means of this coating, a reflection of the visual beam path 11 occurs on the surface 19, whereas the light coming from the laser transmitter 14 is not reflected and passes through the surface 19 without difficulty. The combination of the optical beam path 16 of the laser transmitter 14 with the first visual beam path 11 is therefore localized on the surface 19 of the deflection prism 10, or the splitter prism 18. In order to achieve this the direction of the beam path 16 of the laser transmitter and the direction of the first visual beam path 11 in its objective-side trajectory are co-aligned in the region of, or inside the deflection prism 10. By having the beam path 16 of the laser transmitter 14 also passing the focusing device 7 and the objective 5 in its trajectory towards the object, the laser transmitter 14 or the beam path 16 of the laser transmitter can be focused on the object or in the object plane.

With regard to the beam splitter provided in surface 19, different variant embodiments are possible. In the case where a wavelength-specific partially transparent coating is used, this must be tuned to the wavelength of the laser light of the laser transmitter 14 that is used. This coating has a wavelength-dependent transmission characteristic, which exhibits a very high value of its transmission coefficient only in a very narrow range of wavelengths, wherein this narrow range of wavelengths corresponds to the wavelength of the laser radiation of the laser transmitter 14 that is used. This laser radiation used can be in both the visible wavelength range and a non-visible wavelength range. The use of a laser transmitter 14 emitting in the infrared range is preferable however, since this avoids an adverse effect on the visual observation. Thus the adaptation of the observer's eye in twilight, for example, could be disturbed by scattered light from the laser transmitter 14. In order to effect a splitting of the beam, the polarization of the applied laser light could alternatively be invoked for the selection. A further alternative possibility for a beam splitter involves a spatial division, by for example a metallic mirror only being used for a sub-region of the spatial angle of a beam path or a beam bundle, as is also explained in the following with the aid of the description of FIG. 3.

After the reflection of the laser light on a remote object reflected laser beams jointly re-enter the observation device 1 through the first visual beam path 11. As a result of the partially transparent coating of the surface 19 between the reversing prism 10 and the splitter prism 18, a separation of a beam path 20 of the laser receiver from the first visual beam path 11 takes place at this surface 19. In order to detect and/or measure the reflected laser radiation, a receiver 21 is provided, wherein the laser light is fed through a receiving optical system 22, which according to this exemplary embodiment is formed by the splitter prism 18 and a receiver prism 23. By having the first visual beam path 11 and the beam path 20 of the laser receiver at the surface 19 between the reversing prism 10 and the splitter prism 18 combined or split, a part of the beam path 20 of the laser receiver is thus also integrated into the first visual beam path 11. Thus, in this observation device 1 with a laser range finder 2, to integrate the beam path 16 of the laser transmitter 14 and the beam path 20 of the laser receiver 21 into the first visual beam path 11, optical components are arranged, in which an intersection occurs between the first visual beam path 11 and the beam path 16 of the laser transmitter 14 or the beam path 20 of the laser receiver 21. According to the exemplary embodiment described, the area of the intersection is furthermore localized on a single optical component, namely the surface 19 of the deflection prism 10. Thus both the supply of the laser radiation from the laser transmitter 14, and the separation of the reflected laser radiation from the first visual beam path 11 take place on the single surface 19.

According to the invention therefore, the region of the intersection, i.e. the composition or decomposition of the beam paths 16, 20 of the laser transmitter 14 or of the laser receiver 21 on the one hand, and of the visual beam path 11 on the other is arranged between the observer-side focal point of the objective 5 and the focusing device 7 or the objective 5. Therefore the same arrangement of the optical components of the objective 5 and the focusing device 7 defines both the mapping between the remote object and the image of the object generated on the observer side, as well as the mapping of the laser transmitter 14 and of the laser receiver 21 on to the remote object. This relative spatial arrangement of the aforementioned optical components has the particular advantage that by only changing the adjustment of a single optical component, namely the focusing device 7, the focus of both the first visual beam path 11 as well as of the beam path 16 of the laser transmitter 14 and the beam path 20 of the laser receiver 21 can be set. This means that for each distance setting the radiation reflected back by the remote object can be used very efficiently for the range measurement.

The range measurement is made in the manner known per se, based on the principle of propagation time measurement of a laser pulse or a laser pulse train, which is emitted by the laser transmitter 14 and reflected back by an object. From the ratio of the time difference between the emission of a laser pulse and the arrival of the reflected laser light to the speed of light the range of the sighted object can be found. The arrival time of the reflected laser signal is detected by the receiver 21. A control and analysis unit 24 is provided for the calculation and for controlling the functions of the observation device 1. The value for the range eventually calculated in the control unit 24 can be displayed for the observer in the field of view, by a display element 25 being provided in one of the two observation parts 3, 4 with an appropriate set of display optics 26. The display optics 26 is arranged according to this exemplary embodiment in the second observation part 4 in such a way that the beam path 27 of the display optics 26 is integrated into the ocular-side part of the second visual beam path 12. The region of the intersection of the beam path 27 of the display optics 26 with the second visual beam path 12 is localized as already described for the reversing system 8 of the first observation part 3 on a partially reflecting surface of a prism.

It is of course also possible to display the calculated value of the range, or the target mark 28, in both or optionally in only one of the two observation parts 3, 4. In addition it is also possible advantageously to provide a display, external to the observation device 1, on which the measured range can be displayed continuously or intermittently or at the operator's instruction.

It is also possible, via remote transmission means 41, in particular via wireless remote transmission means 41, for example radio or infrared, to transmit the measured range and other data, such as for example the chosen focus setting and/or an enlargement factor, and/or brightness or temperature values, into different parts of the observation device 1 or separate dedicated devices for display and/or analysis. It is also advantageous however to store these in the observation device 1 or to link them together and store them for different types of analysis and on request, for example, to display them on a display device 42 mounted on the outside of the observation device 1.

It is furthermore possible with these transmission means to transmit these data on to an external display element, which advantageously can also be constructed or arranged independently of the observation device 1. Most advantageous however is the transmission of these data to a telescopic sight of a weapon or other systems for monitoring or controlling devices, which require range information of this kind.

Furthermore, in order to facilitate the sighting of an object the range of which is to be measured, a target mark 28 is provided in the first observation part 3. The target mark 28 or a beam path 29 to the target mark 28 is relayed via a set of target mark optics 30 provided for the purpose in the ocular-side part of the first visual beam path 11. The area of the intersection of the beam path 29 with the target mark 28 is also localized on the surface 19 lying between the deflection prism 10 and the splitter prism 18.

According to an alternative embodiment it is also possible to integrate the beam path 27 of the display element 25, as well as the beam path 29 to the target mark 28, into the first observation part 3 of the observation device 1. Here it would be additionally advantageous, however, to use the display element 25 itself for generating the target mark 28. For the display element 25 an opto-electronic display element is preferably used, allowing an individual control of single image-forming pixels. A simple calibration of the target mark 28 can thus be simply performed. The application of the opto-electronic display element 25 furthermore also allows the shape of the target mark 28 to be freely chosen. Thus it is possible for example, for the observer via a suitable input device to cause the device electronics to choose a desired target mark 28 as the target mark from an appropriate memory via software and to display it. The simultaneous use of the display element 25 to also generate the target mark 28, has the particular advantage of a reduction in the number of components required to fabricate the observation device 1.

The target mark 28 can be fabricated from an optical element and a light source, for example a suitably shaped screen, and superimposed on the visual beam path of the observation parts 3, 4.

The display device, as well as the device for displaying the target mark can be formed by appropriate opto-electronic components, in particular LED, LCD or similar displays.

In another variant embodiment the laser transmitter 14 and the receiver 21 are arranged with their beam paths 16, 20 in the first observation part 3, whereas the display element 25 and the target mark 28 with their beam paths 27, 29 are integrated into the second observation part 4. As stated above, in this case it can also be provided that the display element 25 and the target mark 28 are formed by a common display element 25.

Figure 2:
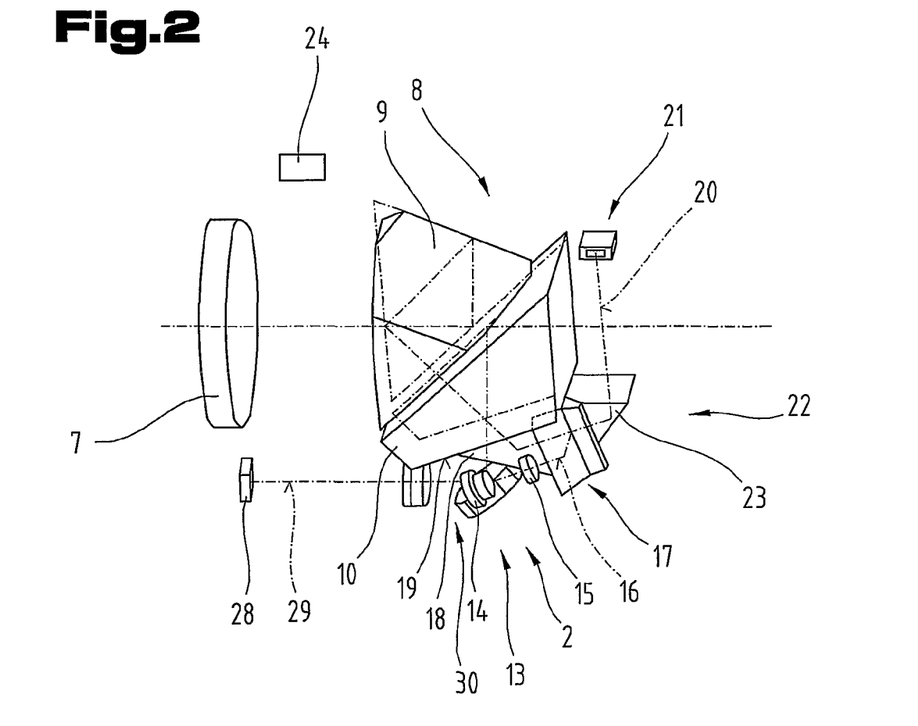
FIG. 2 an enlarged detail of the first observation part according to FIG. 1.

In FIG. 2 a detail of the first observation part 3 according to FIG. 1 is shown in a perspective and enlarged view. Beginning with the laser transmitter 14 the laser light is guided via the beam path 16 of the laser transmitter 14 via the transmission optics 15, the deflection prism 17 and the splitter prism 18 on the surface 19 into the objective-side part of the first visual beam path 11. The reflected laser beams on the surface 19 are guided out of the deflection prism 10 of the reversing system 8 to the receiver 21 and via the splitter prism 18 arrive in the receiver prism 23, where they are finally diverted to the receiver 21. The beam path 29 to the target mark 28 leads from the target mark 28 via the target mark optics 30 through the splitter prism 18 into the deflection prism 10 in a manner or with an alignment such that the beam path 29 to the target mark 28 is transferred into the ocular-side part of the first visual beam path 11.

Figure 3:
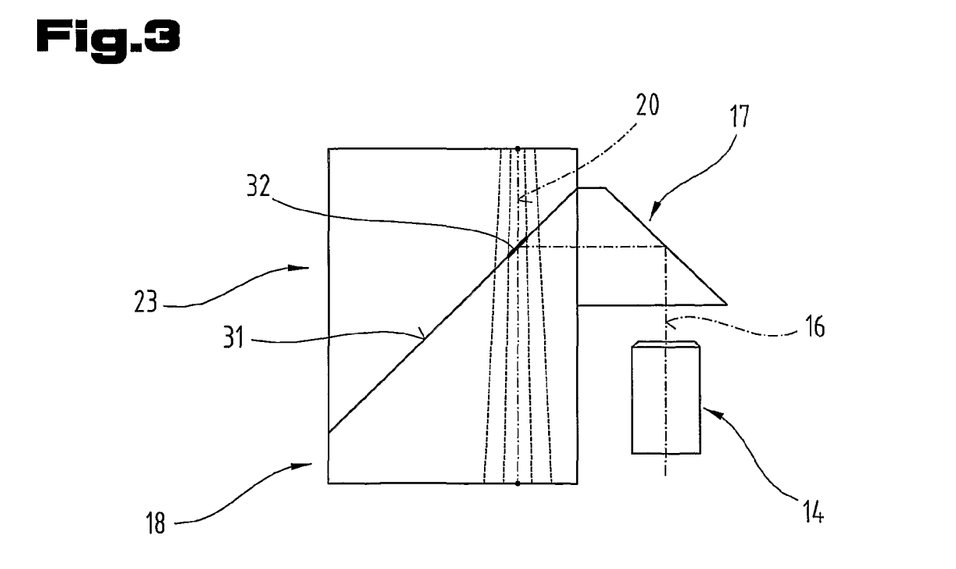
FIG. 3 a section through the transmitter optical system or the receiver optical system according to FIG. 1.

A beam splitter 31 is constructed between the splitter prism 18 and the receiver prism 23, which effects a division between the beam path 16 of the laser transmitter 14 and the beam path 20 of the laser receiver 21, which is better illustrated by FIG. 3.

FIG. 3 shows a section through the transmission optical system 13 or the receiver optical system 22 according to FIG. 1. The different trajectories of the beam path 16 of the laser transmitter 14 and the beam path 20 of the laser receiver 21, which is divided at the beam splitter 31, are shown here. According to this exemplary embodiment the beam splitter 31 is formed by a mirror 32 arranged in the boundary region between the splitter prism 18 and the receiver prism 23. The mirror 32 extends only over a sub-region of the penetration surface of the beam path 20 of the laser receiver 21 through the beam splitter 31 or through the bounding surface between the splitter prism 18 and the receiver prism 23. At the beam splitter 31 therefore, a split takes place between the two beam paths 16 and 20 based on different spatial angular ranges of the beam bundles corresponding to the beam paths 16 and 20 and passing through the beam splitter 31. In a preferred embodiment the mirror 32 has the form of an elliptical surface. The laser light emitted by the laser transmitter 14 has a small opening angle in relation to the light beam bundle reflected by the object. At the mirror 32 therefore, only a minor amount of masking of the laser light reflected by the remote object takes place.

It is provided according to the invention that the receiver prism 23 and the deflection prism 17 are fastened to the splitter prism 18 using putty, for example. In turn, the splitter prism 18 is rigidly connected to the deflection prism 10 of the reversing system 8 of the visual beam path 11. The splitter prism 18, the deflection prism 17, the receiver prism 23 and the deflection prism 10 thus form a monolithically rigidly connected constructional module. An advantage of this is that only a correspondingly small number of different supports needs to be provided to mount the prism system in the observation part 3. The effort required for the adjustment of the spatial position of the corresponding prisms with respect to one another is substantially reduced. Functional errors due to incorrect adjustments are thus also considerably less likely.

Figure 4:
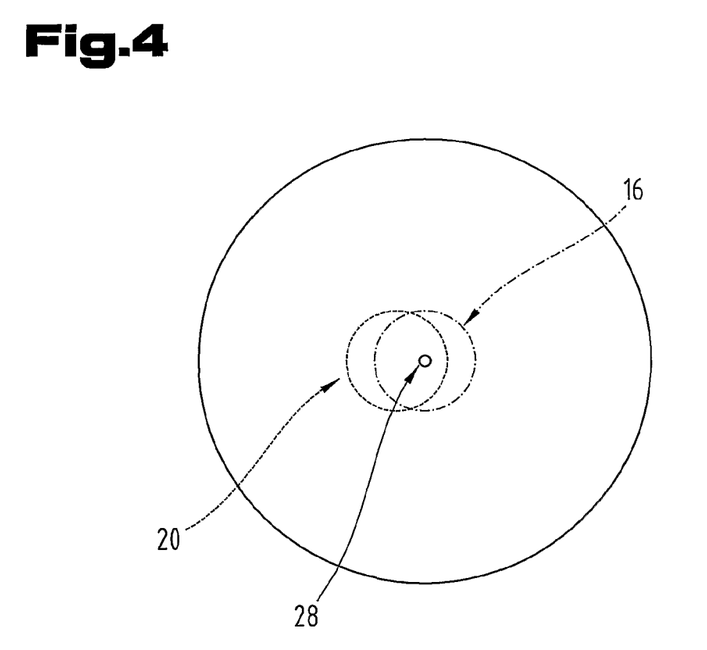
FIG. 4 an image of the field of view observable through the ocular.

FIG. 4 shows an image of the visual field observable through the ocular 6 with the image of the target mark 28. The area of the beam path 16 of the laser transmitter 14 is also indicated by lines with alternating dots and dashes. The beam path 20 of the receiver 21 is shown by dashed lines. The illustration according to FIG. 4 corresponds on the one hand to the region in the object plane, which is illuminated by the laser transmitter 14 or the beam path 16 of the laser transmitter 14 at the object. This is at the same time an image of the laser transmitter 14 focused in the object plane. On the other hand, the region of the beam path 20 of the receiver 21 indicated by a dashed line corresponds to an image of the receiver 21 focused in the object plane. For the receiver 21, only the part of the beam path 20 of the receiver 21 located in the overlapping region is available for the detection of reflected laser light. By an appropriate adjustment of the receiving optical system 22 the regions of the beam path 20 of the receiver 21 indicated in FIG. 4 can be aligned in a centered manner with the region of the beam path 16 of the laser transmitter 14. Preferably both of these regions can be aligned such that the maximum of the reflected laser radiation falls on the receiver 21. It should be added here that the indicated regions 16, 20 are in general not visible to the human eye, since the laser light used is normally chosen in a frequency range lying outside the visible region. Thus, infrared laser diodes are used as laser transmitters 14 for example.

In one variant embodiment, in which the beam path 16 of the laser transmitter 14 is arranged in one of the two visual beam paths 11 or 12 in one of the observation parts 3, 4 and the beam path 20 of the receiver 21 in the other of the two visual beam paths 12 or 11, an adjustment device is provided with which the trajectory of the beam paths 16 and 20 can be displaced to the extent that they overlap on the remote object as much as possible. This means that also in an observation device 1, in which, as indicated in FIG. 1, both the observation parts 3, 4 can be pivoted relative to each other about a central hinged axis, a proper range measurement can be guaranteed. Alternatively however, it is also possible to construct the beam path 20 of the receiver 21 with a larger opening angle than that of the beam path 16 of the laser transmitter 14, so that even in the event of spatial deviations in the position of the two visual beam paths 11 or 12 and different settings of the distance between the eyes. the greatest possible proportion of the radiation emitted by the laser transmitter 14 is detected by the receiver 21. In a corresponding enlargement of the opening angle of the beam path 20 of the receiver 21, even if a relative motion of the beam paths 16, 20 occurs, caused by a spatial displacement of the two observation parts 3, 4 relative to each other about a central hinged axis to adjust the distance between the eyes, this can also be assumed, such that a maximally large proportion of the radiation emitted by the laser transmitter 14 is received by the receiver. These discrepancies can for example be caused by a non-parallel alignment of the two visual beam paths 11, 12 relative to the alignment of the hinged axis.

The variant embodiment, in which the laser transmitter 14 is arranged with its beam path 16 in one of the two observation parts 3, 4 and the receiver 21 with its beam path 20 is arranged in the other observation part 4, 3, has the advantage that in each case the entire region or opening angle of both the visual beam paths 11, 12 is available without restriction to use the laser energy for the range measurement, and therefore a high efficiency can be achieved for the laser range measurement. In the variant embodiments mentioned above the display element 25 and/or the target mark 28 can be arranged in one of the two observation parts 3, 4 or also separately, each in one of observation parts 3 or 4, or also in both observations parts 3, 4, preferably individually activatable.

Since the relevant safety regulations for visual observation devices 1 prescribe only a limited maximal value for the radiation power which is permitted to enter the human eye during the observation, in the observation device 1 according to the invention an adaptation or optimization of the laser power is made, depending on the measured range of the observed object. This is possible because the image of the laser transmitter 14 is also focused on the remote object.

According to a preferred method for observation and measurement of the range of a remote object the observation device 1 is first aimed at the object and this is then sighted. The sighting of the object is supported by superimposing the target mark 28. The superposition of the target mark 28 can be triggered e.g. by activation of a switch and is preferably stopped automatically after starting the measurement procedure carried out by the control and analysis unit 24. While the observation device 1 is kept in position with the object sighted, the measurement procedure, preferably started manually, is carried out. From the propagation time measurements of the laser pulses carried out during the measurement procedure a value for the range of the remote object is then calculated by the control and analysis unit 24, whereupon this value is displayed in the field of view of the second observation part 4 by means of the display element 25.

According to a further variant embodiment of the method, based on the range value that is calculated first of all, a focusing procedure takes place by adjustment of the focusing device 7. Preferably, this adjustment takes place automatically, by the control and analysis unit 24 activating an adjustment motor for example, to displace a focusing lens used as a focusing device 24 [26?].

The focusing of the visual beam paths 11, 12 can also alternatively be carried out semi-automatically. This focusing procedure can also be further speeded up, by a coarse adjustment being first carried out. For this purpose it could be provided that the current value of the position of the focusing devices 7 is determined by a sensor and the range value corresponding to this value is displayed, together with the value for the range determined from the laser range measurement, by means of the display element 25. The user of the observation device 1 therefore has the option, by adjusting the focusing device 7, to vary the length of the visual beam paths 11, 12 until the range value corresponding to the focusing device 7 is equal to the value measured and displayed by the laser range finder.

For the semi-automatic readjustment of the focusing device 7, both for the visual beam path and for the beam path of the measurement signal or of the reflected measurement signal, or for the beam path 16 of the transmitter 14 or of the beam path 20 of the receiver 21, a dedicated display device, which can also be formed by the display device 25 for the range finder, can be used to display the adjustment direction of the activation device for adjusting the focusing device 7, for example by means of arrows, which can also have different lengths depending on the size of the adjustment. Instead of the arrows, any other graphical symbols or optical or acoustic signals can of course be used.

A further variant embodiment of the method for observation and range-finding provides that the method steps for starting a measurement procedure, the calculation of a value for the range of the remote object and the focusing of the focusing device 7 based thereon are carried out not just once but repeatedly in sequence. This means that a higher accuracy for the value of the range and a better focus setting are obtained. By the progressive repetition of these measurement, analysis and focusing steps it is possible, furthermore, to carry out the focusing automatically and in a very userfriendly manner for the observer when an object is moving away or approaching. In both methods, that is both the semi-automatic and the automatic focusing as specified by the method according to the invention the advantage is obtained that the focusing procedure is convenient and reliable, even in twilight or in unfavorable lighting conditions quite generally. The observation device 1 according to the invention, or the methods described with automatic or semi-automatic focusing, are thus also particularly advantageous relative to conventional autofocus systems. This advantage can be obtained in both the binocular observation device according to the invention and also in a long-range optical device formed from only one observation part 3, 4, e.g. terrestrial telescopes or telescopic sights.

Figure 5:
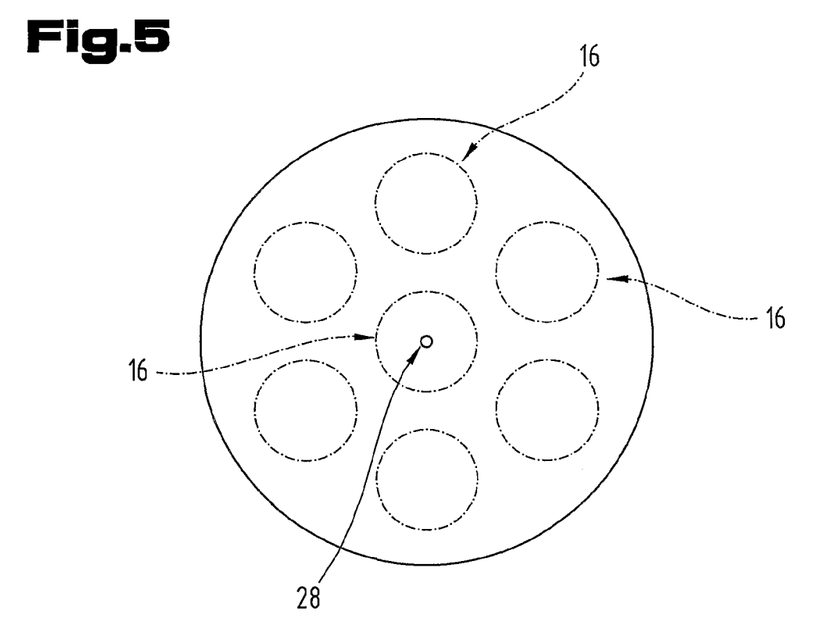
FIG. 5 an image of the field of view observable through the ocular with multiple measurement regions.

FIG. 5 shows a design of a laser range finder 2 with multiple measurement regions or beam paths 16 in the laser transmitter 14. In a corresponding exemplary embodiment of the laser range finder, multiple laser transmitters 14 can also be provided, for example. According to their arrangement relative to each other, multiple receiver regions or multiple receivers 21 are also provided at the location of the laser receiver 21. With such a construction using multiple beam paths 16 for the laser transmitter 14, it is possible to measure and display not just the range of a central object but also the values of ranges of additional objects located in the target zone near to a central object. In an observation device 1 that is fixed in its direction, a method for measuring the movement or the speed of an object that is moving in the target zone is thus also possible. If an object moves in the target zone through two or more of the regions of beam paths 16 as shown in FIG. 5, then this is associated with abrupt changes in the respective values of the range that are recorded by the control unit 24. From the range values recorded as well as the temporal sequence of the abrupt changes in range values, on the basis of the respective angular distances between the measurement regions conclusions can be drawn both about the motion and the rate of motion of an object in the target zone.

According to an alternative variant embodiment corresponding to an observation device 1 according to FIG. 5 with multiple beam paths 16 of the laser transmitter, multiple laser transmitters 14 are not present, but rather the image of the single laser transmitter 14 is deflected into different spatial angular regions in temporal sequence by means of a suitable optical component. The observation regions as shown in FIG. 5 are thus scanned in temporal sequence.

According to a further exemplary embodiment of the method for observation and range-finding, an optical component for continuously modifying the direction of the beam path 16 of the laser transmitter 14 is provided in the laser transmitter 14. This makes it possible to perform, for example, a line-by-line, continuous scanning of the spatial angular range of the field of view of the observation device 1.

Figure 6:
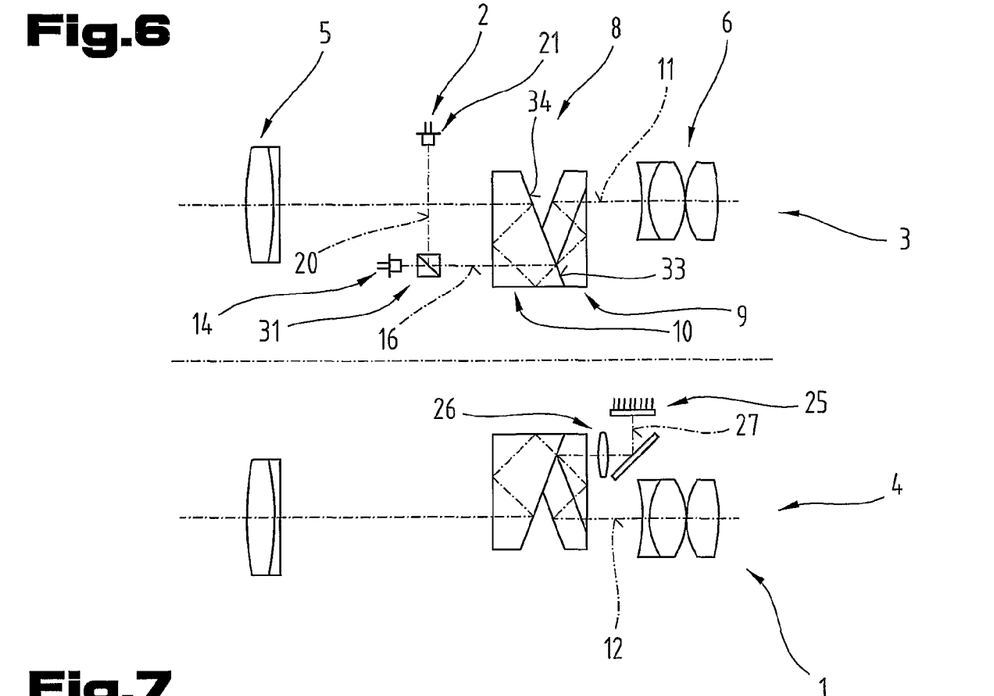
FIG. 6 a further exemplary embodiment of a binocular observation device.

FIG. 6 shows a further exemplary embodiment of a binocular observation device 1 with a long-range optical device, with the objective 5 and the ocular 6. The beam path 11, which is again represented in simplified form only by its main beam, as in the exemplary embodiment specified in FIG. 1, is deflected in its path by a reversing system 8, wherein the structure of the reversing system 8 corresponds to a different type of prism system than that shown in FIG. 1, however. In sequence starting from the objective 5, first of all the deflection prism 10 is provided, followed by the roof prism 9, wherein the two prisms 9, 10 are arranged on a gable surface 33 of the roof prism 9, fastened together by putty or resting against each other. The gable surface 33 resting against the deflection prism 10 is coated with a beam splitting coating. This is preferably transmissive for the spectral region of the observation beam and reflective for the spectral region of the light used by the display element 25. Accordingly the beam path 16 of the laser transmitter 14, after passing through the beam splitter 31 and reflection at the beam splitting coating 33 and further 3 reflections in the deflection prism 17, travels parallel to the first visual beam path 11. Laser light reflected by a remote object follows the reverse path and after reflection at the beam splitting coating in the gable surface 33 it is deflected by the beam splitter 31 towards the receiver 21. Therefore, in the observation device 1 according to this exemplary embodiment, both a part of the beam path 16 of the laser transmitter 14 and a part of the beam path 20 of the receiver 21 are integrated into the first visual beam path 11. The intersection of the beam path 16 and the beam path 20 of the laser transmitter 14 or of the receiver 21 with the first visual beam path 11 is localized on the gable surface 33.

According to the exemplary embodiment described, the superposition of the display element 25 into the ocular-side part of the second visual beam path 12 in the second observation part 4 is provided, whereas the beam paths 16, 20 are integrated into the first observation part 3. As an alternative to this, it is also possible however to integrate the beam path 27 of the display element 25 into the first observation part 3.

In an alternative variant embodiment of the observation device 1 according to FIG. 6 the region of intersection between the beam paths 16, 20 and the first visual beam path 11 can also be localized in the surface 34 of the deflection prism 10 resting against the gable surface 33. The surface 34 must be coated with a beam splitting coating to effect this.

Figure 7:
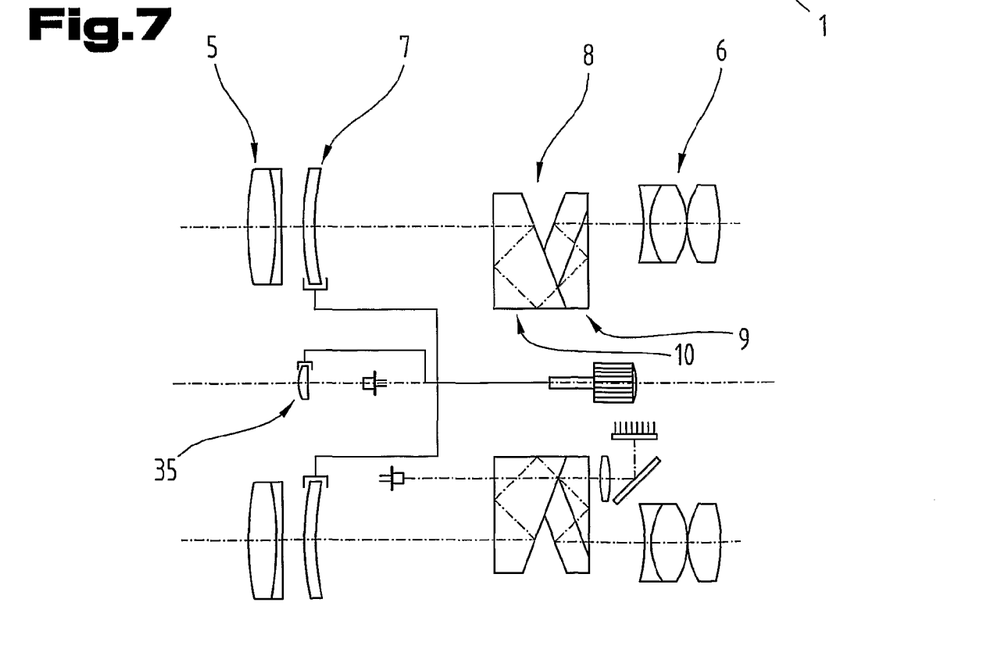
FIG. 7 a further exemplary embodiment of an observation device with a third beam path.

FIG. 7 shows an observation device 1 with a laser range finder 2, in which a separated arrangement of the visual beam paths 11, 12, and thus a third beam path, is provided for the beam path 16 of the laser transmitter 14.

To perform the focusing, a focusing device 7 formed by a focusing lens is integrated into each of the first and second visual beam paths 11, 12. In the beam path 16 of the laser transmitter 14 a transmitter focusing device 35 is arranged on the object side in front of the laser transmitter 14. By adjustment of the transmitter focusing device 35 the image of the laser transmitter 14 can be brought into focus in the object plane of a remote object. According to the invention in this observation device 1 it is provided that the transmitter focusing device 35 is coupled to the focusing device 7 of the two visual beam paths 11, 12, such that the focusing of the image of the laser transmitter 14 can take place at the same time as the focusing of the images of the visual beam paths 11, 12.

With the observation devices 1 according to the exemplary embodiments described in FIGS. 6 and 7 a procedure is possible corresponding to one of the methods described for the observation and measurement of the range, and in particular one for an automatic or semi-automatic focusing process.

Figure 8:
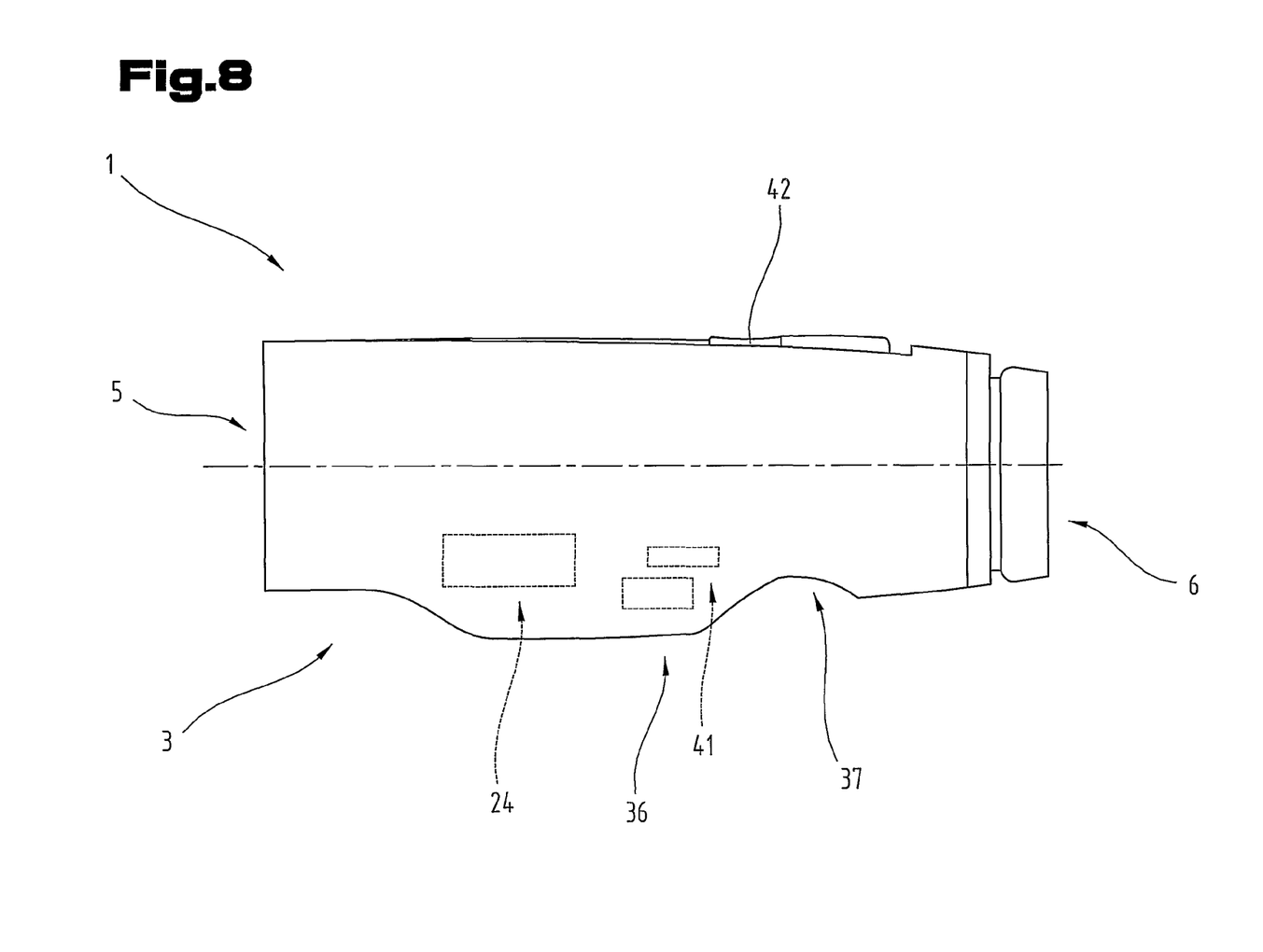
FIG. 8 a side view of the observation device according to FIG. 1.

FIG. 8 shows a side view of the observation device 1 according to FIG. 1. According to the diagram the observation parts 3, 4 have an approximately tubular basic shape. In a lower region of the observation part 3, 4 this comprises a keel-shaped housing extension 36. Furthermore in a region of the observation part 3, 4 adjoining this and facing the ocular 6, a thumb recess 37 is constructed. The housing extension 36 forms an internal accommodation region for the device electronics, in particular for the control and analysis unit 24. The external shape of the housing extension 36 and the thumb recess 37 also form a particularly convenient ergonomic shape, or gripping arrangement, guaranteeing that the observation device 1 can be held comfortably, resting on the balls of the thumbs. Furthermore, this shape also has the advantage of improved leverage to the extent that pivoting of the two observation parts 3, 4 of the observation device 1 is facilitated. Likewise in the event of a linear displacement of the observation parts 3, 4 relative to each other the adjustment of the inter-eye distance is improved.

Figure 9:
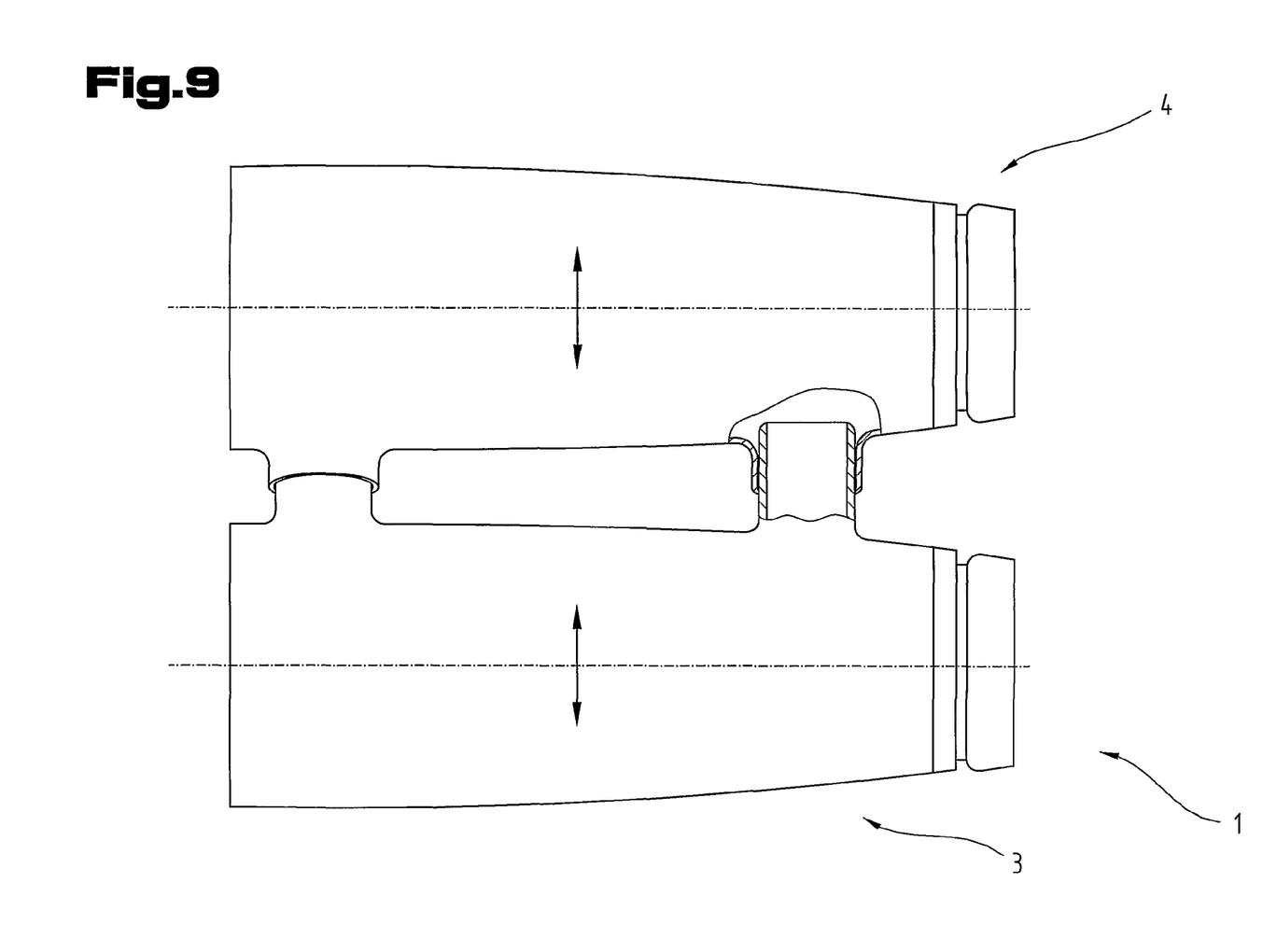
FIG. 9 an observation device 1 with an alternative embodiment of the inter-eye width adjustment.

FIG. 9 shows an observation device 1 with an alternative embodiment of the inter-eye width adjustment of the two observation parts 3, 4. Here between the observation parts 3, 4 at least one telescopic connection is provided, which enables a linear displacement of the observation parts 3, 4 relative to each other in a direction perpendicular to the longitudinal extensions of both observation parts 3, 4. For a more convenient adjustment of the inter-eye distance an adjusting wheel (not shown) can be additionally provided for activating a gear mechanism determining the distance between the eyes.

According to a further embodiment of the observation device 1 according to FIG. 9, the observation parts 3 and 4 form a modular observation device 1. According to this arrangement the first observation part 3 can be separated or decoupled from the second observation part 4, so that the observation part 3 can be used as a stand-alone long-range optical device, wherein the display element 25 is integrated therein. The first observation part 3 can thus be placed for example on a tripod and in such a way can function independently as a laser range finder.

Figure 10:
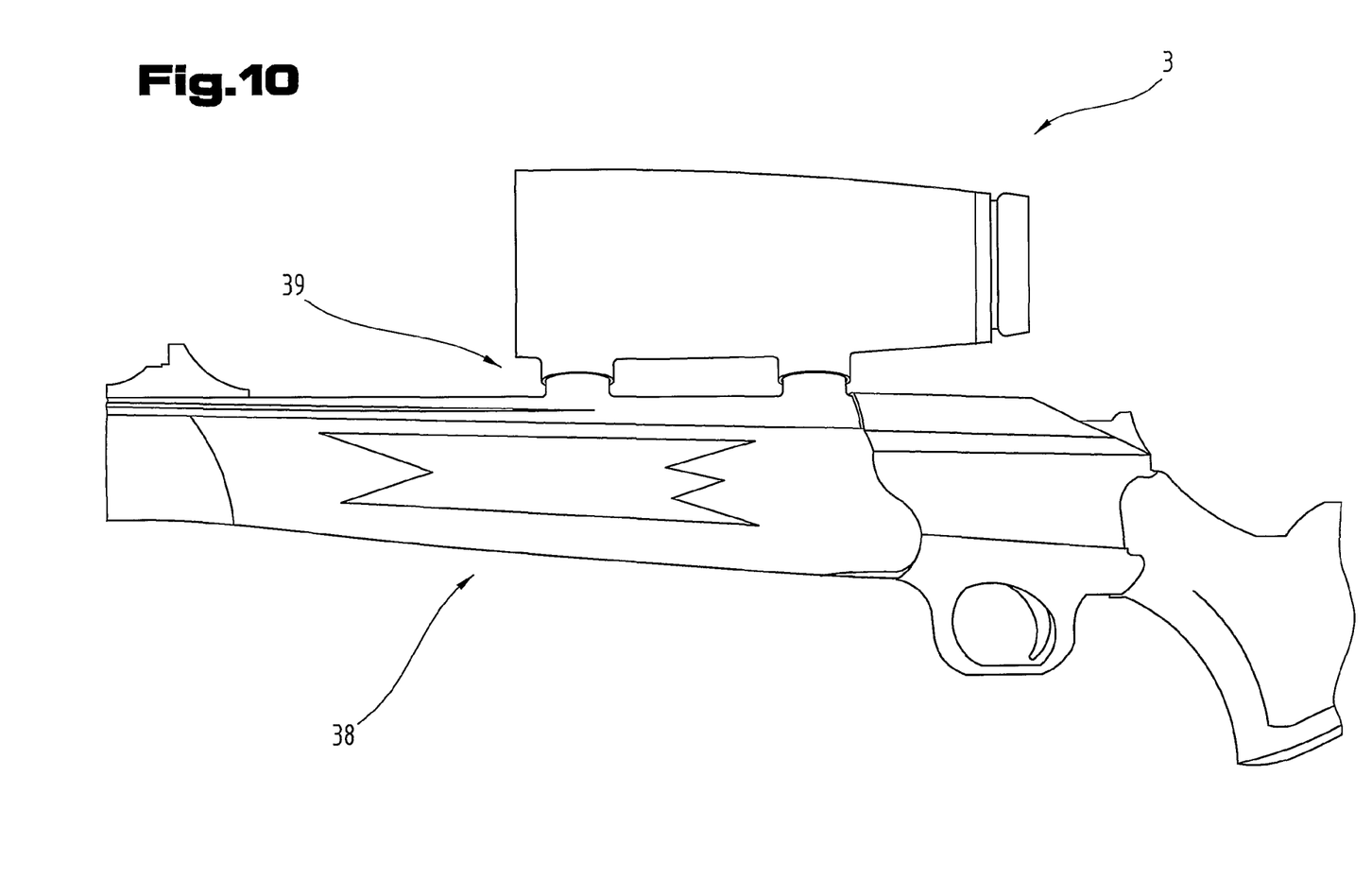
FIG. 10 a further exemplary embodiment of a modular observation device according to FIG. 9.

An alternative possible application of the modular observation device according to FIG. 9 is illustrated in FIG. 10. In this case the observation part 3 is shown as a telescopic sight of a weapon 38. After separation from the second observation part 4 (FIG. 9), the first observation part 3 is placed on a suitably arranged assembly support 39 and thus rigidly connected to the weapon 38. The user then has the further option, using the software controlled device electronics, of configuring the output on the display element 25 into which the function of the target mark 28 is also integrated, to suit the requirements. Thus the user can, for example, fix the horizontal alignment of the range display in the field of view, and also specify a target mark 28 from a preset number of graticules for the additional use of the observation part 3 as a telescopic sight.

In the foregoing description constant reference has been made to a laser range finder 2 and a laser transmitter 14 by way of example, with which the distance between the observation device 1 and an object 40 can be determined and monitored. A person skilled in the working in the field will understand that the invention is not limited to the use of lasers and that other suitable radiation sources can be used in the observation device 1 or the long-range optical device.

It is also possible, via remote transmission means 41, in particular via wireless remote transmission means 41, for example radio or infrared, to transmit the measured range and other data, such as for example the chosen focus setting and/or an enlargement factor and/or brightness or temperature values, into different parts of the observation device 1 or separate dedicated devices for display and/or analysis. It is also advantageous however to store these in the observation device 1 or to link them together and store them for different types of analysis and on request, for example, to display them on a display device 42 mounted on the outside of the observation device 1.

It is furthermore possible with these transmission means to transmit these data on to an external display element, which can also be advantageously constructed or arranged independently of the observation device 1. Most advantageous however is the transmission of these data to a telescopic sight of a weapon or other systems for monitoring or controlling devices, which require range information of this kind. It is also possible, using the remote transmission means 41 or via separate cables from the control and analysis unit 24, to provide the display and/or analysis devices and the adjustment motor 43 for the focusing device 7 or also, in particular, for a transmitter focusing system 35 driven synchronously thereto.

According to the invention the binocular observation device can have two separate hinged axes 44, between which a free space 45 is present, which is laterally bounded by the observation parts 3, 4. Such a binocular observation device 1, in particular a pair of binoculars, has two visual beam paths 11, 12 with a range finder using a measurement beam with a beam transmitter and a beam receiver. A part of one beam path 16, 20 of the beam transmitter or the beam receiver is integrated into at least one beam path 11, 12. The two observation parts 3, 4 are connected to each other via two connection devices 46, spaced apart from each other in the direction of the beam path 11,12 along the observation direction, e.g. by a hinged bridge or a telescopic guide such that they can be adjusted in their position relative to each other. It is advantageous if the beam transmitter, the beam receiver and the optical elements of the beam paths 11, 12, 16, 20 for the measurement beam or the reflected measurement beam and/or the display elements or target marks, as well as the components of the control and monitoring device 24 and of the power supply device, are located outside the free space bounded by the two observation parts between both connection devices and the front faces of the same that face each other.

The exemplary embodiments show possible variant embodiments of the binocular observation device 1 or the long-range optical device, at which point it should be pointed out that the invention is not limited to the variant embodiments of the devices specifically illustrated, but rather that various combinations of the individual variant embodiments among themselves are also possible, and due to the teachings on technical activity by invention in the relevant subject matter, this possibility of variation lies within the expertise of a person skilled in the art in this technical field. There are also therefore any number of conceivable variant embodiments, which are possible by combinations of individual details of the variant embodiment illustrated and described, also included in the scope of protection.

For the sake of completeness it should be finally pointed out that to allow a better understanding of the structure of the binocular observation device 1 or the long-range optical device, these or their component parts have been partially illustrated not to scale and/or enlarged and/or reduced in size.

The problem addressed by the independent inventive solutions can be understood from the description.

In particular, the individual embodiments shown in FIGS. 1, 2, 3, 4, 5; 6; 7; 8; 9 and 10 form the subject matter of independent solutions according to the invention. The corresponding problems and solutions according to the invention can be understood from the detailed descriptions of these Figures.

LIST OF REFERENCE LABELS

1 Observation device
2 Laser range finder
3 First observation part
4 Second observation part
5 Objective
6 Ocular
7 Focusing device
8 Reversing system
9 Roof prism
10 Deflection prism 11 First visual beam path
12 Second visual beam path
13 Transmitter optical system
14 Laser transmitter
15 Transmitter optics
16 Beam path
17 Deflection prism
18 Splitter prism
19 Surface
20 Beam path
21 Receiver
22 Receiver optical system
23 Receiver prism
24 Control and analysis unit
25 Display element
26 Displas optics
27 Beam path
28 Target mark
29 Beam path
30 Target mark optics
31 Beam splitter
32 Mirror
33 Gable surface
34 Surface
35 Transmitter focusing device
36 Housing extension
37 Thumb recess
38 Weapon
39 Assembly support
40 Object
41 Remote transmission means
42 Display device
43 Adjustment motor
44 Hinged axis
45 Free space
46 Connection element

The invention claimed is:

1. A long-range optical device having a visual beam path comprising a reversing system formed by a prism system having a deflection prism between an objective and an ocular, with a laser range finder with a control and analysis unit, and with a laser transmitter and a laser receiver, a part of one beam path of said laser transmitter extending in the visual beam path, and having an opto-electronic display element with a system of display optics and regions of the intersection of the beam paths of the laser transmitter and/or the opto-electronic display element localized on the reversing system, wherein the regions of the intersection of the beam path of the laser transmitter and/or the laser receiver and of the opto-electronic display element into the visual beam path are localized on a single surface of one and the same deflection prism of the reversing system.

2. The long-range optical device according to claim 1 having a focusing device for focusing the visual beam path and the beam path of the laser transmitter wherein the focusing device is arranged between an optical component for the transition of the beam path of the laser transmitter into the visual beam path and the objective.

3. The binocular observation device according to claim 1 having two visual beam paths with an objective and an ocular and having a laser range finder with a laser transmitter and a laser receiver, a part of one beam path of the laser transmitter and the laser receiver being integrated into a first visual beam path, which paths extend through the objective, and with a focusing device for focusing the first visual beam path and the beam path of the laser transmitter is arranged between an optical component for the transition of the beam path of the laser transmitter into the visual beam path and the objective, wherein a part of one beam path of the laser receiver is integrated into a second visual beam path extending through the objective or into a third beam path, and can be focused with a focusing device in the second visual beam path, or into a third beam path isolated from the beam paths, and with a control and analysis unit with an opto-electronic display element.

4. The long-range optical device according to claim 1, wherein the region of the intersection is arranged between an observer-side focal point of the objective and the focusing device or the objective.

5. The long-range optical device according to claim 3, wherein at least a part of one beam path of the display optics or of the display element is integrated into one of the two visual beam paths.

6. The long-range optical device according to claim 3, wherein at least one display element for displaying a target mark and/or a measurement reading from the laser range finder is constructed in at least one of the two visual beam paths.

7. The long-range optical device according to claim 1, wherein remote transmission means is arranged for wireless transmission of a distance determined by the laser range finder or for the transmission of at least one of an enlargement factor or brightness or temperature value to an opto-electronic display element or to the control and analysis unit.

8. The long-range optical device according to claim 1, wherein a further display element is arranged on the outside of the observation device.

9. The long-range optical device according to claim 1, wherein the control and analysis unit is wirelessly connected via remote transmission means to an external display element independent of the observation device.

10. The long-range optical device according to claim 1, wherein the opto-electrical display element is in the form of an LED or LCD display with individual control capability of single image-forming pixels.

11. The long-range optical device according to claim 2, wherein the focusing device comprises an adjustment motor.

12. The long-range optical device according to claim 11, wherein the control and analysis unit is connected to the adjustment motor.

13. The long-range optical device according to claim 2, wherein two observation parts are arranged, which are connected to each other via two connection devices, spaced apart from each other in the direction of the beam path, e.g. a hinged bridge or a telescopic guide, such that they can be adjusted in their relative position to each other.

14. The long-range optical device according to claim 13, wherein both of the observation parts are adjustably connected via two connection devices, spaced apart from each other in the direction of the beam path along the observation direction, to two separate hinged axes, between which a free space is present that is bounded at the side by the observation parts.

15. The long-range optical device according to claim 13, wherein the connection element includes end regions facing the two observation parts, and is connected via a hinge at each of the end regions to each of the two observation parts, the pivot axes of which extend parallel to the longitudinal axes of both observation parts.

16. The long-range optical device according to claim 15, wherein one or more hinged bridges are arranged as the connecting element.

17. The long-range optical device according to claim 13, wherein a keel-shaped housing extension is formed on at least one of the observation parts.

18. The long-range optical device according to claim 1, wherein the housing extension comprises an inner accommodation area for the control and analysis unit.

19. The long-range optical device according to claim 13, wherein at least one of the two observation parts is constructed as a self-contained long-range optical device.

20. The long-range optical device according to claim 2, wherein the optical component or components for the transition of the beam path of the laser transmitter and/or the laser receiver are formed by the components of a reversing system.

21. A binocular observation device with two visual beam paths and with a laser range finder with a laser transmitter and a laser receiver, a part of one beam path of the laser transmitter or of the laser receiver being integrated into a first visual beam path, and the other respective beam path of the laser receiver or the laser transmitter being arranged as a third beam path isolated from the visual beam paths, and having an opto-electronic display element, and a control and analysis unit wherein the third beam path comprises an adjustable focusing device interactively coupled to a focusing device of both visual beam paths to focus on a remote object.

22. The long-range optical device according to claim 1, wherein the control and analysis unit is connected to the opto-electronic display element for displaying a target mark or a measurement reading from the laser range finder in the visual beam path.

* * * * *

UNITED STATES PATENT AND TRADEMARK OFFICE
CERTIFICATE OF CORRECTION

| | | |
|---|---|---|
| PATENT NO. | : 8,953,150 B2 | Page 1 of 1 |
| APPLICATION NO. | : 12/865471 | |
| DATED | : February 10, 2015 | |
| INVENTOR(S) | : Pernstich et al. | |

It is certified that error appears in the above-identified patent and that said Letters Patent is hereby corrected as shown below:

On the title page (75), delete "Rolder" and insert --Roider--.

Signed and Sealed this
Sixteenth Day of February, 2016

Michelle K. Lee
*Director of the United States Patent and Trademark Office*